United States Patent
Pursifull

(10) Patent No.: US 9,243,588 B2
(45) Date of Patent: Jan. 26, 2016

(54) VARIABLE PRESSURE GASEOUS FUEL REGULATOR

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 527 days.

(21) Appl. No.: 13/623,706

(22) Filed: Sep. 20, 2012

(65) Prior Publication Data

US 2014/0076283 A1    Mar. 20, 2014

(51) Int. Cl.
*F02M 21/02* (2006.01)
*F02M 25/08* (2006.01)
*F02D 19/06* (2006.01)

(52) U.S. Cl.
CPC ....... *F02M 21/0239* (2013.01); *F02D 19/0647* (2013.01); *F02M 25/089* (2013.01); *Y02T 10/32* (2013.01); *Y02T 10/36* (2013.01)

(58) Field of Classification Search
CPC ............ F02M 59/366; F02M 63/0225; F02M 21/0239; F02M 25/089; F02D 2250/31; F02D 19/0647; Y02T 10/36; Y02T 10/32
USPC .................... 123/458, 457, 27 GE, 525–527, 123/575–578; 48/189
See application file for complete search history.

(56) References Cited

U.S. PATENT DOCUMENTS

| | | | | | |
|---|---|---|---|---|---|
| 4,294,214 | A | * | 10/1981 | Treible et al. ................ | 123/458 |
| 4,364,364 | A | * | 12/1982 | Subramaniam ............... | 123/527 |
| 4,453,523 | A | * | 6/1984 | Poehlman ..................... | 123/527 |
| 4,505,249 | A | * | 3/1985 | Young ........................... | 123/527 |
| 4,597,364 | A | * | 7/1986 | Young ....................... | 123/27 GE |
| 5,117,798 | A | * | 6/1992 | Nozaki ......................... | 123/527 |
| 5,367,999 | A | * | 11/1994 | King et al. .................... | 123/458 |
| 5,515,829 | A | | 5/1996 | Wear et al. | |
| 5,522,369 | A | * | 6/1996 | Povinger ....................... | 123/527 |

(Continued)

FOREIGN PATENT DOCUMENTS

WO    2008149383 A1    12/2008
WO    2008149384 A1    12/2008

OTHER PUBLICATIONS

Hübner, Dirk et al., "Modelling, Simulation and Simulation based Optimization of Fuel Systems for Natural Gas Powered Engines," EngOpt 2008—International Conference of Engineering Optimization, Rio de Janeiro, Brazil, Jun. 1-5, 2008, 10 pages.

(Continued)

*Primary Examiner* — Stephen K Cronin
*Assistant Examiner* — Susan E Scharpf
(74) *Attorney, Agent, or Firm* — Julia Voutyras; Alleman Hall McCoy Russell & Tuttle LLP

(57) ABSTRACT

Methods and systems are provided for varying fuel injection pressure in a gaseous-fueled vehicle. A mechanical pressure regulator may be modified to regulate the pressure of gaseous fuel to varying pressures based on electronic pressure feedback and engine operating conditions. In one example, a regulating pressure in a low pressure chamber of a pressure regulator may be varied by controllably flowing gaseous fuel into or out of a reference chamber of the pressure regulator, and the gaseous fuel exhausted from the reference chamber may be directed to the engine for combustion.

18 Claims, 5 Drawing Sheets

(56) References Cited

U.S. PATENT DOCUMENTS

| | | | | |
|---|---|---|---|---|
| 5,755,210 | A | * | 5/1998 | Sato et al. .............. F02B 43/00 123/518 |
| 5,967,119 | A | * | 10/1999 | Burkhard et al. ............. 123/458 |
| 6,039,030 | A | * | 3/2000 | Robinson et al. ............. 123/457 |
| 6,131,552 | A | * | 10/2000 | Paielli et al. ....... F02M 21/0233 123/27 GE |
| 6,942,787 | B2 | * | 9/2005 | Robinson et al. ............... 210/97 |
| 7,661,409 | B2 | * | 2/2010 | Schule ......................... 123/458 |
| 7,878,179 | B2 | * | 2/2011 | Ikeya ........................... 123/457 |
| 2004/0000293 | A1 | * | 1/2004 | Keesee et al. ................ 123/457 |
| 2011/0132330 | A1 | | 6/2011 | Pursifull |

OTHER PUBLICATIONS

Pursifull, Ross Dykstra, "Gaseoue Fuel Rail Depressurization During Inactive Injector Conditions," U.S. Appl. No. 13/623,695, filed Sep. 20, 2012, 45 pages.

* cited by examiner

VARIABLE PRESSURE GASEOUS FUEL REGULATOR

FIELD

The present application relates to variable injection pressure regulation for gaseous-fueled vehicles.

BACKGROUND/SUMMARY

Alternate fuels have been developed to mitigate the rising prices of conventional fuels and for reducing exhaust emissions. For example, natural gas has been recognized as an attractive alternative fuel. For automotive applications, natural gas may be compressed and stored as a gas in cylinders at high pressure. A pressure regulator may then be used to supply the compressed natural gas (CNG) at lower pressures to an engine combustion chamber. The pressure regulator may provide this gaseous fuel at a fixed, constant pressure to the engine, or it may be a variable pressure regulator which can provide gaseous fuel at varying pressures to the engine.

Many advantages may be achieved by using a variable pressure regulator to provide gaseous fuel to the engine, instead of a pressure regulator which provides gaseous fuel to the engine at a fixed, constant pressure. For example, varying the pressure of gaseous fuel increases the dynamic range of the injector (the injector's dynamic range being the "turn down ratio" of fuel that can be injected). Providing a lower fuel pressure during low fuel demand allows for a longer fuel injection pulse width, which allows for injections of lower, repeatable mass. As another example, varying the pressure of gaseous fuel enables use of a lower pressure of gaseous fuel during engine cold start when only a marginal voltage is available to open the injectors, because the lower injector opening voltage may be sufficient for injecting gaseous fuel at a lower injection pressure. As still another example, varying the pressure may allow rare, peak fuel demands to be satisfied without having to subject the injector to the durability challenge of injecting high pressure gaseous fuel at all times.

Despite the advantages of variable pressure regulators, known variable pressure regulators are costly and prone to instability. For example, in some systems, variable pressure regulation is achieved by exposing the reference chamber of the regulator to intake manifold pressure. However, this dependency on intake manifold pressure limits the operability of the pressure regulator when intake manifold vacuum is not within a certain range. In other systems, pressure variability is achieved by changing the reference pressure via a valve from the high pressure source. As another example, one known variable pressure regulator varies the pressure of gaseous fuel by duty cycling a main valve between the regulator and the fuel rail. However, systems which rely on a single valve to perform pressure regulation, where the valve is subject to a flow of high pressure gaseous fuel, may not be adequately robust. For these and other reasons, vehicles may include mechanical pressure regulators which provide a fixed, constant pressure of gaseous fuel to the engine.

In contrast to the variable pressure regulation systems described above, the inventors herein have recognized that gaseous fuel may be provided to the engine at varying pressures in a cost-effective manner, without compromising stability, by raising and lowering the regulating pressure (via raising and lowering the pressure in the reference chamber) of a mechanical pressure regulator. A passage coupling a lower pressure chamber of the regulator with the reference chamber may include a valve, which may be controlled to flow gaseous fuel from the high pressure chamber to the reference chamber to increase the pressure of the reference chamber. Further, a passage coupling the reference chamber to the engine (e.g., to the intake manifold, crankcase, ejector vacuum, vacuum pump vacuum, or fuel vapor storage canister) or to atmosphere may include another valve to reduce the pressure of the reference chamber. Via control of these valves, the pressure in the reference chamber may be varied, which in turn varies the pressure of the gaseous fuel delivered to the engine (e.g., to fuel injectors of the engine) from the low pressure chamber of the regulator. The valves may be controlled by an electronic pressure feedback system, and may be fixed orifice or powertrain control module (PCM) controlled solenoid valves. Superimposing an electronic pressure feedback control system on top of a mechanical pressure regulation system in this way enables variation of the pressure of gaseous fuel delivered to the engine via control of these valves. Advantageously, the valves may be small and inexpensive, and yet the system may still outperform variable pressure regulation approaches which involve duty cycling a main valve between the regulator and the fuel rail.

In one example, a method for regulating gaseous fuel pressure in an engine comprises varying a regulating pressure in a low pressure chamber of a pressure regulator by controllably flowing gaseous fuel into and/or out of a reference chamber of the pressure regulator. This method may enable a mechanical pressure regulator to regulate fuel pressure to different pressures, via the flow of fuel into or out of the reference chamber. For example, the regulating pressure may be increased by controlling a pressure up valve to flow gaseous fuel into the reference chamber from the low pressure chamber, and the regulating pressure may be decreased by controlling a pressure down valve to flow gaseous fuel out of the reference chamber. The engine fuel rail may communicate with the low pressure chamber of the regulator, and thus the regulating pressure may be a pressure which results in a desired fuel rail pressure being achieved. The valves may be controlled based on electronic pressure feedback, e.g. feedback a fuel rail pressure sensor indicating a current fuel rail pressure, and based on engine operating conditions. For example, during low load conditions it may be desirable to inject fuel at a lower pressure relative to a current fuel rail pressure.

In this way, variable pressure regulation may be achieved by controlling valves to flow relatively small amounts of gaseous fuel into and out of the reference chamber of a pressure regulator (as compared to the amount of gaseous fuel flowing from the regulator to the fuel rail), rather than by (or in addition to) duty cycling a main valve in a conduit delivering fuel to the fuel rail. As such, smaller and lower cost valves may be used in the claimed configurations, relative to a system utilizing the duty cycling approach, which results in cost savings, if desired. Further, the gaseous fuel exhausted from the reference chamber when the pressure down valve is opened may be directed to the engine for combustion, thereby improving fuel efficiency. Furthermore, in embodiments where actuators of the pressure up and down valves are PCM controlled, the PCM has knowledge of the extra fuel flow to the engine and can compensate appropriately.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
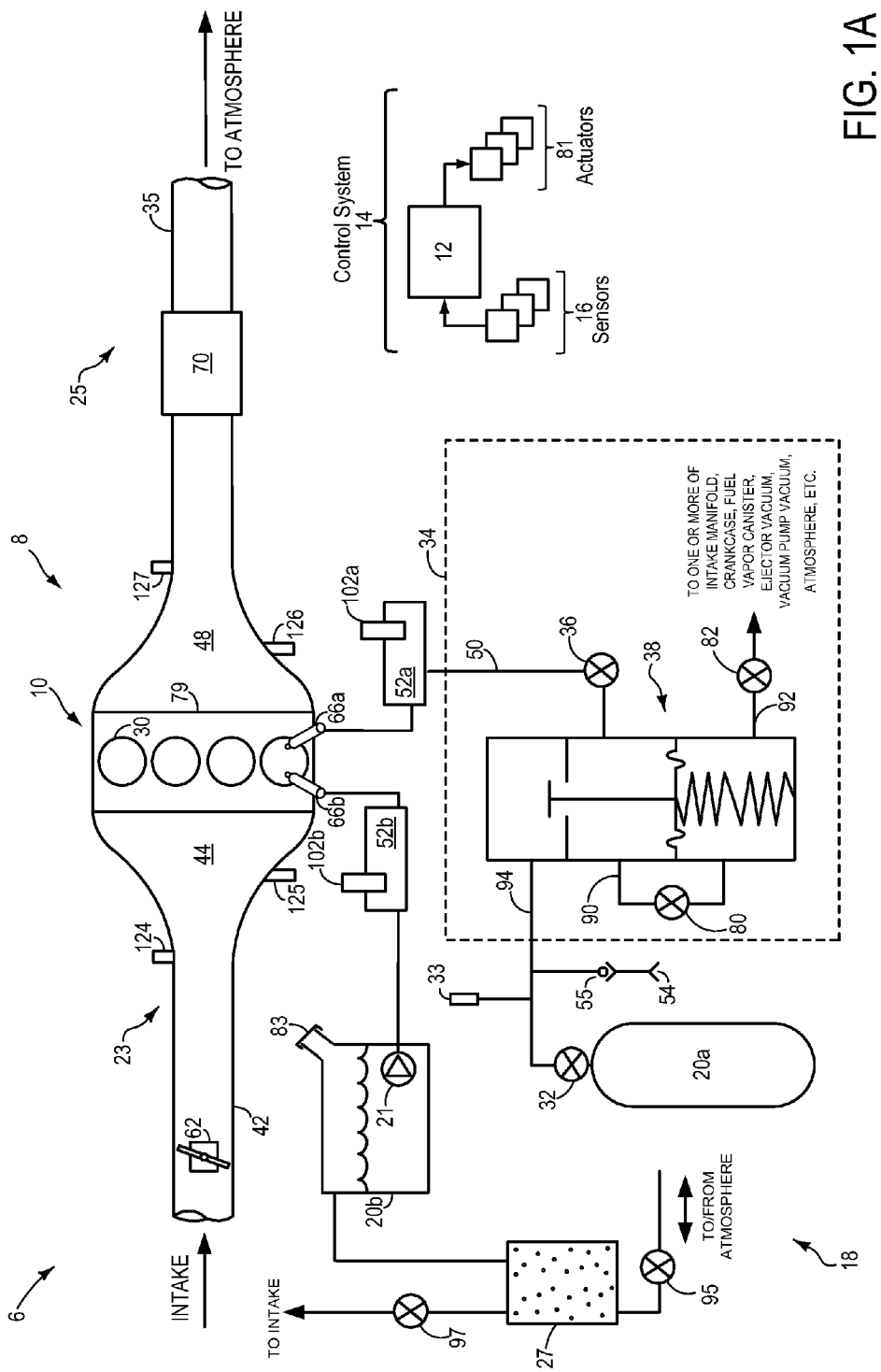
FIG. 1A shows a schematic depiction of an engine system configured to operate on a gaseous fuel as well as one or more other fuels of differing chemical and/or physical properties, the system including a pressure regulation system for regulating the pressure of a gaseous fuel rail.

Methods and systems are provided for variable pressure regulation of gaseous fuel in a vehicle system such as the system of FIG. 1A. The vehicle system includes a pressure regulation system, such as the system shown in FIGS. 1A-B, which may be operated in accordance with the methods of FIGS. 2 and 3. For example, valves of the pressure regulation system may be operated in accordance with the method of FIG. 3 to vary the regulating pressure of the system, which in turn varies the pressure of an engine fuel rail to provide variable injection pressure of the gaseous fuel. The relationship between various parameters of the pressure regulation system, with respect to time, is shown in FIG. 4.

FIG. 1A shows a schematic depiction of a vehicle system 6. The vehicle system 6 includes an engine system 8, a control system 14, and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere upon passage through an emission control device 70. Engine 10 may further include a crankcase 79 encasing a crankshaft (not shown), the crankshaft driven by the movement of pistons of cylinders 30. It will be appreciated that other components may be included in the engine such as a variety of valves and sensors.

Control system 14 is shown receiving information from a plurality of sensors 16 (various examples of which are described herein) and sending control signals to a plurality of actuators 81 (various examples of which are described herein). As one example, sensors 16 may include MAP and MAF sensors 124 and 125 in the intake, exhaust gas sensor 126 and temperature sensor 127 located in the exhaust, pressure sensor 33 coupled to a gaseous fuel line, pressure sensors 102a and 102b coupled to respective fuel rails, etc. Other sensors such as pressure, temperature, fuel level, air/fuel ratio, and composition sensors may be coupled to various locations in the vehicle system 6. As another example, the actuators may include fuel pumps, fuel injectors 66a and 66b, throttle 62, fuel tank valves, and the valves of pressure regulation system 34. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 2-3.

Fuel system 18 may include one or more fuel tanks. In the depicted example, the fuel system is a multi-fuel system including a high pressure fuel tank 20a configured to deliver a gaseous fuel to a fuel rail 52a via a pressure regulation system 34, and a fuel tank 20b configured to deliver a fuel having chemical and physical properties different from the gaseous fuel (e.g., a liquid fuel) to fuel rail 52b. While the depicted example includes separate fuel rails for the two different fuels, in some examples a common fuel rail may be used.

Fuel tank 20a may be configured to store a gaseous fuel at high pressure and deliver the fuel to the engine 10 via high pressure fuel line 94, pressure regulator 38, and regulated pressure fuel line 50. For example, the gaseous fuel may be compressed natural gas (CNG), liquefied petroleum gas (LPG), absorbed natural gas (ANG), or hydrogen fuel. Fuel tank 20a may store the gaseous fuel in a pressure range of 10-700 bar (e.g., 0-100+ psi for LNG fuel, 500 psi for ANG fuel, 3600 psi, or 250 bar, for CNG fuel, and 5000-10,000 psi for hydrogen fuel).

In contrast, fuel tank 20b may store liquid fuel such as gasoline, fuel with a range of alcohol concentrations, various gasoline-ethanol fuel blends (e.g., E10, E85), and combinations thereof. As shown, fuel tank 20b may be coupled to a fuel pump 21 for pressurizing fuel delivered to the fuel rail. Further, fuel tank 20b may be coupled to a fuel vapor storage canister 27 which may store fuel vapors that are displaced from the fuel tank 20b. Fuel vapor canister 27 may be filled with adsorbent to temporarily trap fuel vapors (including vaporized hydrocarbons) during fuel tank refilling operations and "running loss" (that is, fuel vaporized during vehicle operation). In one example, the adsorbent used is activated charcoal. Fuel vapor canister 82 may communicate with the atmosphere through a canister vent valve (CVV) 95. The flow of air and vapors between fuel vapor canister 27 and the atmosphere may be adjusted via CVV 95. For example, CVV 95 may route gases (e.g., air) to the atmosphere when storing, or trapping, fuel vapors from fuel tank 20b. CVV 95 may also allow fresh air to be drawn into the canister when purging stored fuel vapors. Fuel vapors released from canister 27, for example during a purging operation, may be directed to intake 23 (e.g., upstream or downstream of throttle 62 or other intake components), and ultimately into intake manifold 44. The flow of vapor may be regulated by a canister purge valve (CPV) 97, coupled between the fuel vapor canister and intake 23.

Fuel tank 20a may be refilled with gaseous fuel via fueling port 54. A check valve 55 (or two check valves in series for redundancy) may be coupled between fuel tank 20a and the fueling port 54 to ensure correct flow of fuel. Similarly, fuel tank 20b may be refilled with liquid fuel via fueling port 83. Fuel may be delivered from fuel tanks 20a and 20b to the injectors of engine 10, such as example injectors 66a and 66b, via fuel rails 52a and 52b, respectively. While only a single injector coupled with each fuel rail is depicted, it will be appreciated that additional injectors are provided for each cylinder 30. In one example, where fuel system 18 includes a direct injection system, injectors 66a and 66b may be configured as direct fuel injectors. In an alternate embodiment, fuel system 18 may include a port injection system wherein injectors 66a and 66b may be configured as port fuel injectors. In still other embodiments, each cylinder may include one or more injectors including a direct injector and a port injector.

Pump 21 may not pump fuel from fuel tank 20b to fuel rail 52b during conditions where liquid fuel delivery to the engine is not desired (e.g., during engine off conditions, or during conditions where delivery of gaseous fuel alone to the engine is desired). A fuel rail pressure sensor 102b in fuel rail 52b may be configured to sense the current fuel rail pressure and provide the sensed value to controller 12 of control system 14. In some examples, pump 21 may be controlled based on the fuel rail pressure sensed by sensor 102b, and/or based on other parameter values.

Further, in some embodiments, a check valve (not shown) may be positioned between fuel tank 20b and fuel rail 52b to ensure correct flow of fuel from fuel tank 20b.

Fuel tank 20a may be coupled to a fuel tank valve 32 for regulating a pressure of the gaseous fuel delivered into fuel line 94. Fuel tank valve 32 may be configured to deliver the gaseous fuel into fuel line 94 at a pressure that is similar to tank pressure Alternatively, even when a high fuel injection pressure is desired, the fuel tank valve may be activated and a pressure regulation system downstream of the valve may be controlled to ensure that the fuel rail pressure is regulated to a sufficiently high pressure. Such operation may be preferable in examples where high pressure gaseous fuel flow through various components that may be included fuel line 94 (e.g., filters, valves, etc) would degrade the components.

Fuel tank 20a may further be coupled to a pressure regulation system 34 to enable gaseous fuel to be provided to fuel rail 52a and from there to injector 66a at variable pressures. In one example, fuel tank 20a may store gaseous fuel in a pressure range of 10-700 bar, while pressure regulation system 34 may regulate the fuel rail pressure to a variable range of 2 to 40 bar (e.g., 2 to 10 bar for CNG fuel).

Figure 1B:
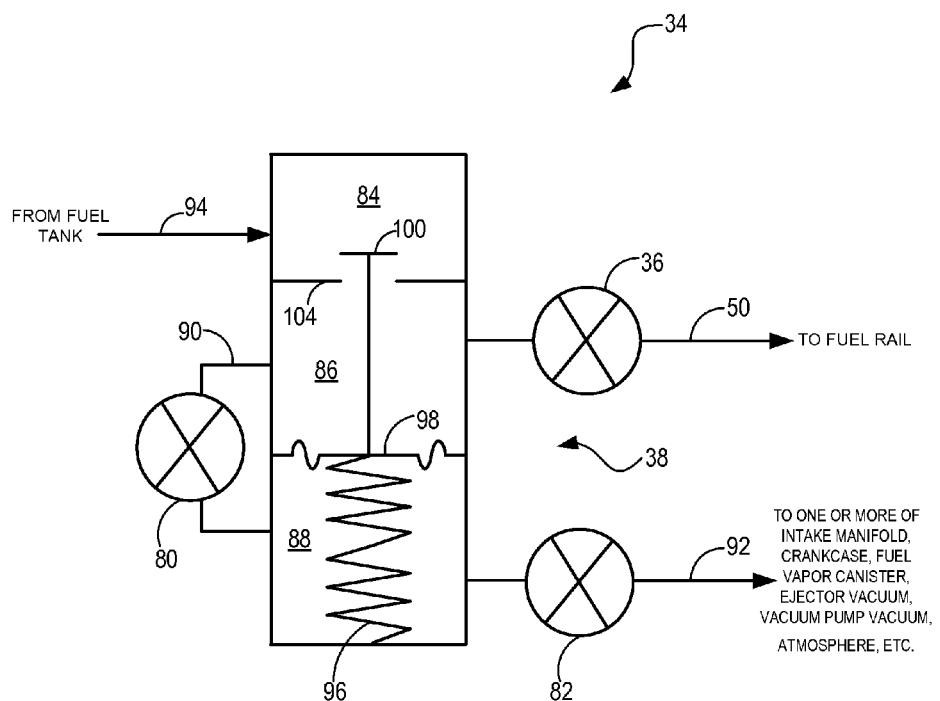
FIG. 1B shows a detail view of the pressure regulation system of FIG. 1A.

As shown in the detail view of FIG. 1B, pressure regulation system 34 includes a pressure regulator 38. Pressure regulator 38 includes a high pressure chamber 84 which receives gaseous fuel from fuel tank 20a via fuel line 94, a low pressure chamber 86 which provides pressure-regulated gaseous fuel to fuel rail 52a, and a reference chamber 88. Like a mechanical pressure regulator, pressure regulator 38 includes a diaphragm 98 and a valve 100. A position of valve 100 relative to an aperture in a wall 104 separating high pressure chamber 84 and low pressure chamber 86 determines the flow rate of gas from 84 to 86. The position of valve 100 depends on the pressure in reference chamber 88 and low pressure chamber 86, and on spring force provided by spring 96 coupled with a bottom of pressure regulator 38 on one end and with a bottom of diaphragm 98 on the other end. As the pressure in the reference chamber increases, a greater pressure is needed in low pressure chamber 86 to achieve any given position of valve 100. For example, the high pressure chamber may communicate with the low pressure chamber via the aperture when a pressure in the reference chamber exceeds a threshold, the threshold corresponding to a pressure at which the diaphragm moves the valve 100 above wall 104. As the pressure in the reference chamber decreases, a lower pressure is needed in low pressure chamber 86 to achieve a force balance. However, unlike mechanical pressure regulators which control a reference chamber pressure to a fixed, constant pressure to achieve a fixed, constant regulating pressure in a low pressure chamber, pressure regulation system 34 includes pressure up and down conduits and valves which enable variation of the reference chamber pressure, the reference chamber pressure in turn varying the regulating pressure in the low pressure chamber. As shown in FIGS. 1A-B, a pressure up valve 80 is arranged in a pressure up conduit 90, which couples the low pressure chamber with the reference chamber, and a pressure down valve 82 is arranged in a pressure down conduit 92, which may couple the reference chamber with one or more of the intake manifold, crankcase, fuel vapor canister, ejector vacuum, vacuum pump vacuum, or atmosphere. In some examples, either one (but not both) of valves 80 and 82 may be replaced with a fixed geometry leak such as a sonic choke, bell mouth, or sharp-edged orifice. As described below for the methods of FIGS. 2-3, valves 80 and 82 may be controlled to vary the pressure in reference chamber 88, thereby varying the regulating pressure in low pressure chamber 86. For example, during some engine operating conditions, it may be desirable to increase the fuel rail pressure from its current value so as to inject fuel into engine cylinders at a higher pressure. Pressure up valve 80 may be opened to flow gaseous fuel from low pressure chamber 86 into reference chamber 88, thereby increasing the pressure in the reference chamber. Increased pressure in the reference chamber raises the pressure of fuel in low pressure chamber 86 (the regulating pressure) due to the movement of diaphragm 98 towards wall 104. Alternatively, during other engine operating conditions, it may be desirable to decrease the fuel rail pressure from its current value, so as to inject fuel into engine cylinders at a lower pressure. Toward this end, pressure down valve 82 may be opened to evacuate gaseous fuel from reference chamber 88, thereby decreasing the pressure in the reference chamber and in turn decreasing the regulating pressure of the fuel in low pressure chamber 86 due to the movement of the diaphragm 98 away from the wall 104. The gaseous fuel exhausted from the reference chamber via the opening of pressure down valve 82 may be directed to engine system 8 via conduit 92, for example to intake manifold 44, crankcase 79, ejector vacuum, or vacuum pump vacuum, or to fuel vapor storage canister 27. Alternatively, the evacuated gaseous fuel may be discarded to atmosphere.

It will be appreciated that in embodiments where valve 80 is replaced with a fixed geometry orifice, opening valve 82 results in the lowest achievable pressure in the reference chamber, and closing valve 82 results in the highest achievable pressure in the reference chamber. Alternatively, if valve 82 is replaced with a fixed geometry orifice, opening valve 80 "overwhelms" the small leak at valve 82 and raises the pressure in the reference chamber, whereas closing valve 80 results in a draining of all the pressure in the reference chamber and the pressure is lowered.

A fuel rail lock-off valve 36 arranged in fuel line 94 may be closed to prevent communication between pressure regulator 38 and fuel rail 52a during conditions where gaseous fuel delivery to the engine is not desired (e.g., during engine off conditions, or during conditions where delivery of liquid fuel alone to the engine is desired). Otherwise, fuel rail lock-off valve 36 may be opened such that fuel may be delivered from pressure regulator 38 to fuel rail 52a. In contrast to valves in systems which vary fuel rail pressure via duty cycling of a valve intermediate a pressure regulator and a fuel rail, fuel rail lock-off valve 36 may be a simple valve which is only controllable to a fully open or fully closed state, and which does not serve to vary the pressure of fuel delivered to the fuel rail. However, in other examples, pressure regulation system 34 may duty-cycle fuel rail lock-off valve 36 based on feedback from the fuel rail pressure sensor, such that the valve works in conjunction with or replaces the other pressure-regulating mechanisms of the systems during select operating conditions.

Pressure regulation system 34 may regulate fuel rail pressure based on electronic feedback from the fuel rail. A fuel rail pressure sensor 102a may be configured to sense the current fuel rail pressure and provide the sensed value to controller 12 of control system 14. If the current fuel rail pressure is not within a range of a desired fuel rail pressure determined based on engine operating conditions, the controller may control valves 80 and 82 to achieve the desired fuel rail pressure, and open valve 36 to allow fluid communication between the pressure regulator and the fuel rail.

In some embodiments, a check valve (not shown) may be positioned between fuel tank 20*a* and pressure regulation system 34 to ensure correct flow of fuel from the fuel tank. A tank output line pressure sensor (or pressure transducer) 33 may be positioned upstream of pressure regulation system 34 and downstream of fuel tank 20*a* to provide an estimate of the pressure in fuel line 94 before pressure regulation of the fuel by the pressure regulation system 34. That is, pressure sensor 33 may provide an estimate of fuel pressure input on the higher pressure side of pressure regulator 38. A coalescing filter (not shown) may be positioned on the lower pressure side of pressure regulator 38 such that fuel rail lock-off valve 36 is coupled between pressure regulator 38 and the coalescing filter.

Figure 2:
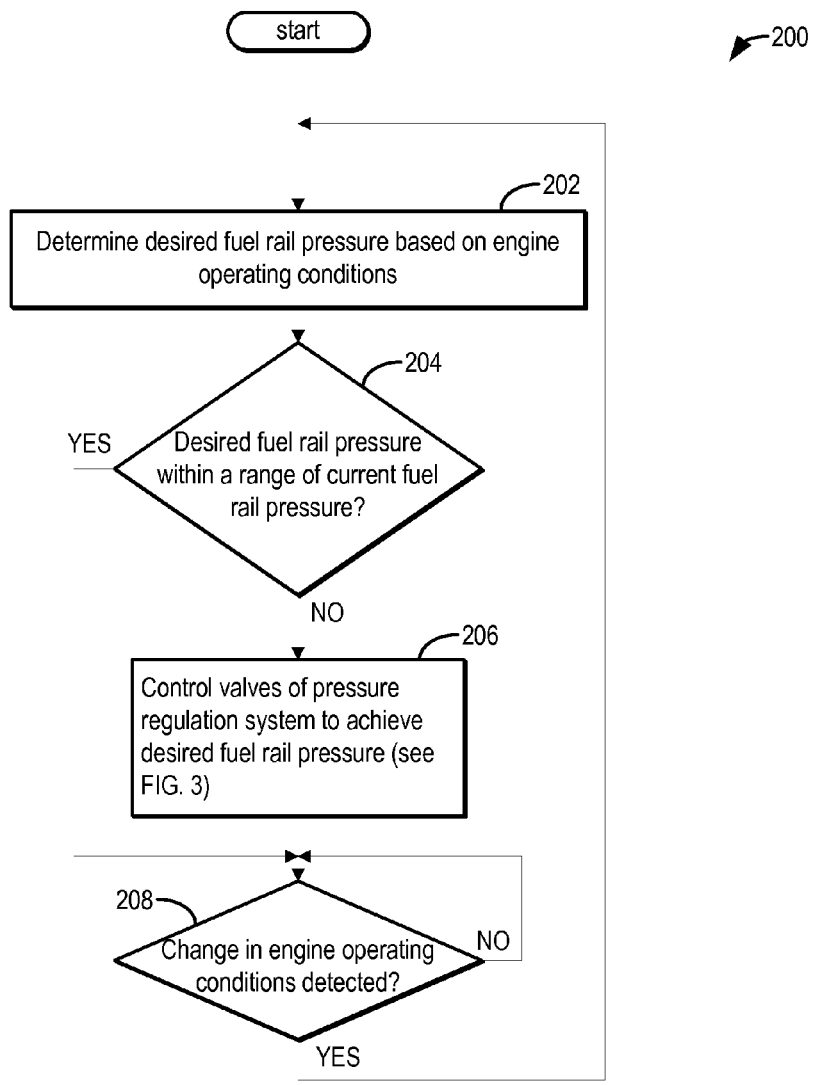
FIG. 2 shows an example high level flowchart for operating the pressure regulation system of FIGS. 1A-B.

Now turning to FIG. 2, an example method 200 for operating the pressure regulation system of FIGS. 1A-B is described. It will be appreciated that references to "fuel rail pressure" in method 200 refer to the pressure of fuel rail 52*a* coupled with pressure regulation system 34 and the high pressure (gaseous) fuel tank, rather than the pressure of fuel rail 52*b* coupled with fuel tank 20*b*.

At 202, the method includes determining a desired fuel rail pressure based on engine operating conditions. The engine operating conditions may include, for example, engine speed, torque demand, ambient conditions (e.g., temperature, pressure, humidity, etc.), engine temperature, fuel level in the fuel tank, whether an engine cold start is in progress, etc. These conditions may be measured based on input from sensors 16 of control system 14, for example. In one example, when engine operating conditions include an engine cold start, the desired fuel injection pressure may be a lower pressure, which may be achievable by the fuel injectors even when only a marginal voltage is available to open the injectors during cold start. Similarly, when engine operating conditions include low fuel demand, for example during low load conditions, the desired fuel injection pressure may be a lower pressure to reduce wear at the injectors (e.g., by allowing for longer pulse width and thus achieve repeatability for lower mass injections). In contrast, during peak fuel demand conditions, the desired fuel rail pressure may be a higher pressure. In these conditions, the desired fuel rail pressure may be a higher pressure. In one example, the desired fuel rail pressure may be stored in memory of control system 14. The determination of desired fuel rail pressure may be a routine performed at fixed intervals throughout operation of engine system 8, or may be performed on an interrupt basis when certain engine operation parameter values change.

At 204, method 200 includes determining whether the desired fuel rail pressure is within a range of the current fuel rail pressure. For example, control system 14 may make this determination by receiving the sensed value of current pressure at fuel rail 52*a* from fuel rail pressure sensor 102*a*, and comparing the sensed value to the stored desired fuel rail pressure value via controller 12. The range may be a predetermined range, and sensitivity of the engine to changes in fuel rail pressure may be a factor in determination of the predetermined range. There may be one predetermined range which is applicable to all desired fuel rail pressure values, or alternatively, different desired fuel rail pressure values may be associated with different predetermined ranges.

If the answer at 204 is YES, method 200 proceeds to 208 to await detection of a change in engine operating conditions, as will be detailed below. For example, if the current fuel rail pressure is within a range of the desired fuel rail pressure, it may not be necessary to adjust the valves of the pressure regulation system to modify the fuel rail pressure until a change in engine operating conditions is detected which results in a change to the value of the desired fuel rail pressure.

Figure 3:
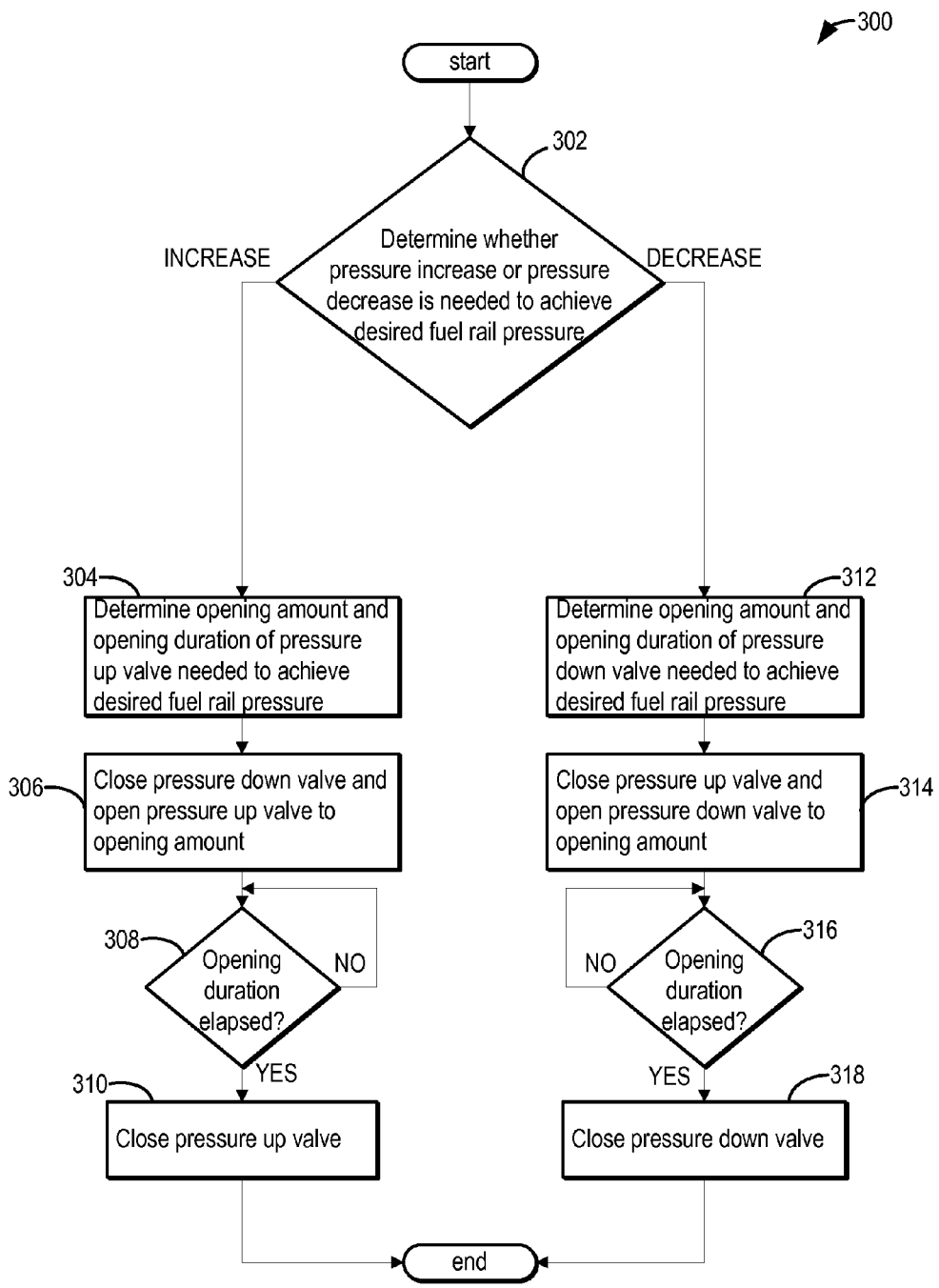
FIG. 3 shows an example high level flowchart for controlling valves of the pressure regulation system of FIGS. 1A-B to achieve a desired fuel rail pressure.
Figure 4:
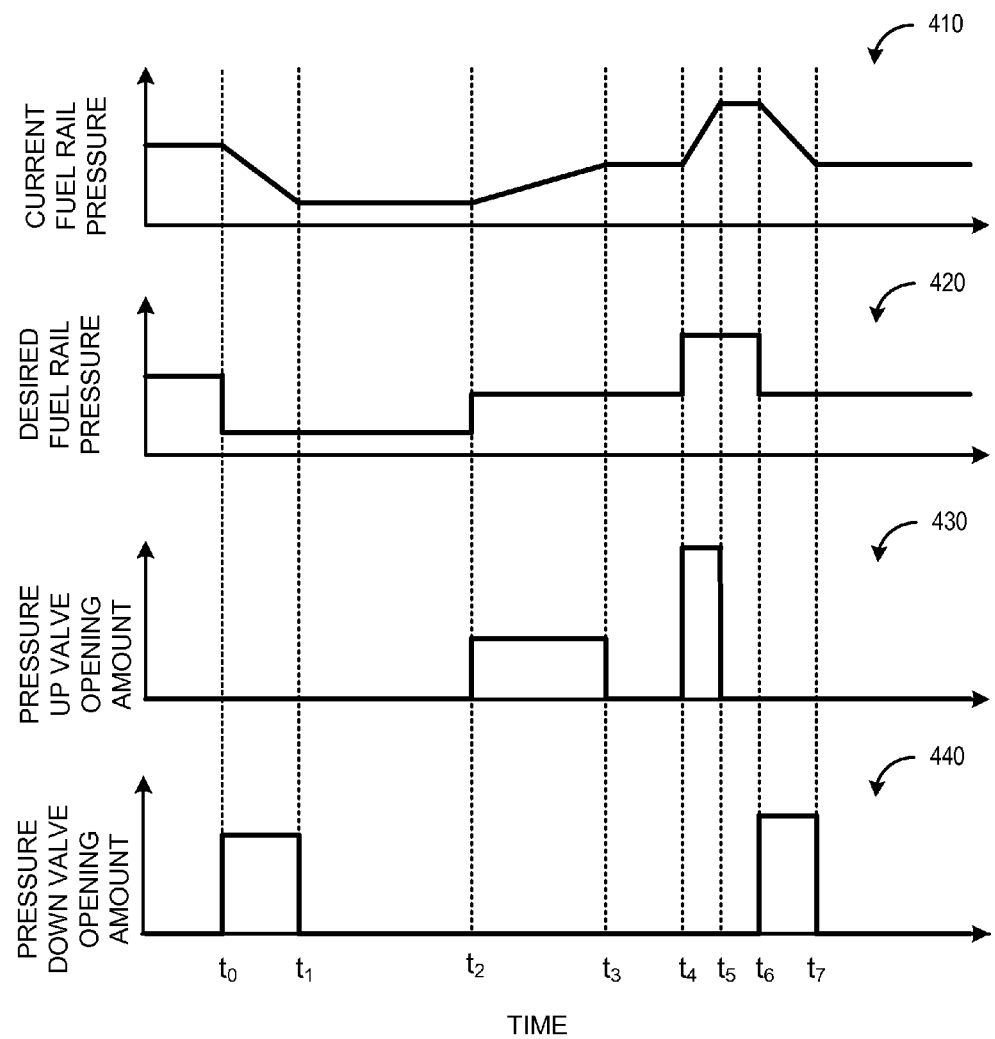
FIG. 4 shows example timing diagrams illustrating the relationship between various parameters of the pressure regulation system of FIGS. 1A-B with respect to time.

Otherwise, if the answer at 204 is NO, method 200 proceeds to 206 to control the valves of the pressure regulation system, for example via the method shown in FIG. 3. As detailed below for FIG. 3, this may include controlling the valves to either increase or decrease the regulating pressure which in turn may increase or decrease the fuel rail pressure. It will be appreciated that while the valves of the pressure regulation system are controlled to vary the regulating pressure, the engine may or may not be running on a different fuel, e.g. fuel from tank 20*b* of FIG. 1A.

After 206, method 200 continues to 208. At 208, method 200 includes determining whether a change in engine operating conditions has been detected. The determination may be made at predetermined intervals, or on an interrupt basis. For example, once the valves of the pressure regulation system have been initially controlled to achieve a desired fuel rail pressure, the pressure regulator may regulate fuel rail pressure to a fixed, constant pressure. The controller may then intermittently assess engine operating conditions. When the intermittent assessment detects a change in engine operating conditions (e.g., a change which may impact desired fuel rail pressure such as operator tip-in), the answer at 208 is YES and method 200 may return to 202 to determine a desired fuel rail pressure based on the changed engine operating conditions. Alternatively, after performing step 206, the pressure regulator may regulate the fuel rail pressure to a fixed, constant value (e.g., the desired fuel rail pressure) until the controller generates an interrupt indicating that a change in engine operating conditions has been detected. When the interrupt is generated, the answer at 208 is YES, and method 200 may return to 202 to determine a desired fuel rail pressure based on the changed engine operating conditions.

Method 200 may be performed continually throughout operation of the engine, thereby ensuring that fuel rail pressure is regulated to an appropriate value when engine operating conditions change. It will be appreciated that throughout engine operation, the desired fuel rail pressure may change numerous times, and the valves of the pressure regulation system may be controlled numerous times to achieve the different desired fuel rail pressures. For example, at engine cold start, the valves may be controlled to regulate fuel rail pressure to a first desired fuel rail pressure. After engine warm up, the change in engine operating conditions may result in the desired fuel rail pressure changing from the first desired fuel rail pressure to a second desired fuel rail pressure, and the valves may be controlled to regulate fuel rail pressure to the second desired fuel rail pressure. Subsequent changes in engine operating conditions may motivate further control of the valves to regulate the fuel rail pressure to a third desired fuel rail pressure, a fourth desired fuel rail pressure, etc. Similarly, it will be appreciated that a desired pressure for the gaseous fuel rail may vary based on whether the engine is operated with injection of gaseous fuel alone, gaseous fuel and liquid fuel, or liquid fuel alone. For example, in some embodiments, method 200 may be performed partially or not at all during conditions where injection of liquid fuel alone (e.g., from fuel tank 20*b* via fuel rail 52*b*) is desired.

An example method 300 for controlling the valves of a pressure regulation system (e.g., pressure regulation system 34 of FIGS. 1A-B) to achieve a desired fuel rail pressure is shown in FIG. 3. In one example, method 300 may be performed at step 206 of method 200. As described above for method 200, it will be appreciated that references to "fuel rail pressure" in method 300 refer to the pressure of the fuel rail coupled with the pressure regulation system and the high pressure (gaseous) fuel tank (e.g., fuel rail 52a), rather than the pressure of a fuel rail coupled with a liquid fuel tank (e.g., fuel rail 52b).

At 302, method 300 includes determining whether a pressure increase or a pressure decrease is needed to achieve a desired fuel rail pressure (e.g., the desired fuel rail pressure determined at step 202 of method 200). In one example, controller 12 may execute a routine which determines which of the desired fuel rail pressure and the current, sensed fuel rail pressure is higher and which is lower.

If the desired fuel rail pressure is determined to be higher than the sensed fuel rail pressure, the answer at 302 is INCREASE, and method 300 continues to 304. At 304, method 300 includes determining an opening amount and an opening duration of the pressure up valve. The opening duration may be a time duration, a number of events, or other such duration. The opening amount may be an opening degree, such as an opening area amount. The opening amount and opening duration determined at this stage may be values which result in achievement of the desired fuel rail pressure. By varying both the opening amount and the opening duration of the pressure up valve, the rate of pressure increase in the low pressure chamber may be controlled. In some examples, it may be desirable to minimize the opening amount of the pressure up valve and maximize the opening duration, to slowly ramp up the fuel rail pressure and thereby ensure a smooth transition without effects which may be noticeable to the vehicle operator. In other examples, it may be desirable to maximize the opening of the pressure up valve and minimize the opening duration, to achieve increase fuel rail pressure as quickly as possible (e.g., during a sudden acceleration). Alternatively, the pressure up valve may be a simple valve which is controllable to be either fully open or fully closed. In this case, the determination of opening amount may include determining that the valve should be (fully) opened, and the opening duration may be the only controllable parameter.

Once the opening amount and opening duration of the pressure up valve have been determined, method 300 proceeds from 304 to 306. At 306, method 300 includes closing the pressure down valve, and opening the pressure up valve to the opening amount determined at 304. In one example, opening and closing the pressure up and pressure down valves may be performed by PCM-controlled solenoid actuators. In another example, each valve may be opened and closed by another type of actuator. Depending on the state of the pressure down valve, the step of closing the pressure down valve may include taking no action (if the pressure down valve is already closed) or closing the pressure down valve (if the pressure down valve is open). Similarly, depending on the state of the pressure up valve, the step of opening the pressure up valve to the opening amount may include opening the pressure up valve to the opening amount from a fully closed position, or modifying the opening amount of the pressure up valve if it is already open to some extent.

After 306, method 300 proceeds to 308. At 308, method 300 includes determining whether the opening duration has elapsed. For example, the controller may execute a routine comparing the count to a number corresponding to the determined opening duration at predetermined intervals. If it is determined that the opening duration has not elapsed, the answer at 308 is NO, and method 300 returns to 308 to check again whether the opening duration has elapsed, e.g. after the predetermined interval. Once the check results in a positive duration that the opening duration has elapsed, method 300 continues from 308 to 310. Alternatively, the controller may increment a count at each clock signal pulse starting when the pressure up valve is opened, and may generate an interrupt when the count reaches a number which corresponds to the opening duration determined at 304. At the interrupt, method 300 may advance from 308 to 310.

At 310, method 300 includes closing the pressure up valve. For example, the controller may control an actuator of the pressure up valve to close the valve. After 310, method 300 ends.

However, if the desired fuel rail pressure is determined to be lower than the sensed fuel rail pressure at 302, the answer is DECREASE, and method 300 continues from 302 to 312. At 312, method 300 includes determining an opening amount and an opening duration of the pressure down valve. The opening amount and opening duration determined at this stage may be values which result in achievement of the desired fuel rail pressure. By varying both the opening amount and the opening duration of the pressure down valve, the rate of pressure decrease in the low pressure chamber may be controlled, in a manner similar to that described above with respect to the pressure up valve. Unlike the pressure up valve, however, the pressure down valve is arranged in a conduit coupling the reference chamber of the pressure regulator with one or more of the intake manifold, crankcase, fuel vapor canister, ejector vacuum, vacuum pump vacuum, atmosphere, etc., as shown in FIGS. 1A-B. Accordingly, additional factors may be involved in the determination of opening amount and opening duration of the pressure down valve, depending on where the conduit housing the pressure down valve (e.g., conduit 92 of FIGS. 1A-B) leads, and depending on engine operating conditions. Alternatively, the pressure down valve may be a simple valve which is controllable to be either fully open or fully closed. In this case, the determination of opening amount may include determining that the valve should be (fully) opened, and the opening duration may be the only controllable parameter.

Once the opening amount and opening duration of the pressure down valve have been determined, method 300 proceeds from 312 to 314. At 314, method 300 includes closing the pressure up valve, and opening the pressure down valve to the opening amount determined at 312. In one example, opening and closing the pressure up and pressure down valves may be performed by PCM-controlled solenoid actuators. In another example, each valve may be opened and closed by another type of actuator. Depending on the state of the pressure up valve, the step of closing the pressure up valve may include taking no action (if the pressure up valve is already closed) or closing the pressure up valve (if the pressure up valve is open). Similarly, depending on the state of the pressure down valve, the step of opening the pressure down valve to the opening amount may include opening the pressure down valve to the opening amount from a fully closed position, or modifying the opening amount of the pressure down valve if it is already open to some extent.

It will be appreciated that when the pressure down valve is opened, gaseous fuel is exhausted from the reference chamber of the regulator. In a preferred embodiment, the gaseous fuel exhausted from the reference chamber is directed to the intake manifold of the engine or to a fuel vapor storage canister. However, in other embodiments, the gaseous fuel may be directed elsewhere, and/or may be directed through one or more ejectors/venturis/aspirators to generate vacuum.

After 314, method 300 proceeds to 316. At 316, method 300 includes determining whether the opening duration has elapsed, for example in the manner discussed above with respect to step 308. If it is determined that the opening duration has not elapsed, the answer at 316 is NO, and method 300 returns to 316. Once it is determined that the opening duration has elapsed, the answer at 316 is YES, and method 300 continues to 318.

At 318, method 300 includes closing the pressure down valve. For example, the controller may control an actuator of the pressure down valve to close the valve. After 318, method 300 ends.

It will be appreciated that when method 300 ends, regardless of whether the method involved increasing or decreasing the fuel rail pressure, both the pressure up and pressure down valves are closed. Accordingly, after method 300 is performed, the reference chamber of the pressure regulator may be sealed due to the closure of the two valves, and the regulator may regulate the fuel rail pressure to a fixed, constant pressure—e.g., a first desired fuel rail pressure—until the desired fuel rail pressure changes (e.g., due to a change in engine operating conditions in accordance with method 200). When the desired fuel rail pressure changes to a second desired fuel rail pressure, for example due to changes in engine operating conditions, method 300 may be initiated to vary the pressure in the reference chamber of the pressure regulator to regulate the fuel rail pressure to the second desired fuel rail pressure instead of the first desired fuel rail pressure. As described above with respect to FIG. 2, throughout engine operation, desired fuel rail pressure may change many times, and thus the pressure regulation system may be controlled to vary the regulating pressure of the pressure regulator many times to achieve the desired fuel rail pressure for given engine operating conditions. Alternatively, in some examples, the engine operating conditions influencing the desired fuel rail pressure may remain constant throughout engine operation (e.g., throughout one vehicle trip), but may vary from one engine operation to another (e.g., from one vehicle trip to another, for example a vehicle trip on a summer day vs. a vehicle trip on a winter day, or from a vehicle trip at a low altitude to a vehicle trip at a high altitude). In such examples, the pressure regulation system may regulate fuel rail pressure to a single desired fuel rail pressure throughout a first engine operation (or first vehicle trip), and to a single, different desired fuel rail pressure throughout a second engine operation (or second vehicle trip).

FIG. 4 depicts example timing diagrams illustrating the relationship between various parameters of a pressure regulation system, e.g. pressure regulation system 34 of FIGS. 1A-B, with respect to time. Current fuel rail pressure is depicted in diagram 410, desired fuel rail pressure is depicted in diagram 420, pressure up valve opening amount is depicted in diagram 430, and pressure down valve opening amount is depicted in diagram 440. Each diagram depicts time along the x axis and a respective operating parameter along the y axis.

In one non-limiting example, prior to time $t_0$, the pressure regulation system has regulated the fuel rail pressure to the first desired fuel rail pressure, either from a previous desired fuel rail pressure or from a fuel rail pressure at engine start. As shown, prior to time $t_0$, the pressure up and pressure down valves are fully closed (as the current fuel rail pressure is equal to the desired fuel rail pressure during this interval, and does not need to be varied via opening of the pressure up or down valves).

At time $t_0$, the desired fuel rail pressure decreases from a first desired fuel rail pressure to a second desired fuel rail pressure. To decrease the current fuel rail pressure to the second desired fuel rail pressure, the pressure down valve is partially opened from time $t_0$ to time $t_1$, as shown in diagram 440. The opening amount of the pressure down valve and the interval between time $t_0$ and time $t_1$ may correspond to an opening amount and an opening duration determined at step 312 of method 300, for example. Meanwhile, the pressure up valve remains fully closed from time $t_0$ to time $t_1$. At time $t_1$, the current fuel rail pressure achieves the second desired fuel rail pressure, and the pressure down valve is closed.

From time $t_1$ to time $t_2$, the desired fuel rail pressure is the second desired fuel rail pressure and the current fuel rail pressure is equal to the second desired fuel rail pressure. As such, the pressure up and down valves are fully closed during this interval, as the current fuel rail pressure does not need to be varied to achieve the desired fuel rail pressure. At time $t_2$, however, the desired fuel rail pressure increases from the second desired fuel rail pressure to a third desired fuel rail pressure. As shown, in this example, the third desired fuel rail pressure is greater than the second desired fuel rail pressure, but less than the first desired fuel rail pressure.

To increase the current fuel rail pressure to the third desired fuel rail pressure, the pressure up valve is partially opened from time $t_2$ to time $t_3$, as shown in diagram 430. The opening amount of the pressure up valve and the interval between time $t_2$ and time $t_3$ may correspond to an opening amount and an opening duration determined at step 312 of method 300, for example. In this example, it is less urgent for the current fuel rail pressure to achieve the third desired fuel rail pressure than it was for the current fuel rail pressure to achieve the second desired fuel rail pressure. Accordingly, the opening amount of the pressure up valve from time $t_2$ to time $t_3$ is smaller than the opening amount of the pressure down valve from time $t_0$ to time $t_1$, while the opening duration of the pressure up valve (the interval between time $t_2$ and time $t_3$) is greater as compared to the opening duration of the pressure down valve during the transition from the first desired fuel rail pressure to the second desired fuel rail pressure (the interval between time $t_2$ and time $t_3$). In this way, the desired fuel rail pressure may be achieved while minimizing valve wear during engine operating conditions where a slower transition from one desired fuel rail pressure to another desired fuel rail pressure is acceptable. Meanwhile, the pressure down valve remains fully closed from time $t_2$ to time $t_3$.

At time $t_3$, the current fuel rail pressure achieves the third desired fuel rail pressure, and the pressure up valve is closed. Because the current fuel rail pressure is equal to the desired fuel rail pressure (i.e., the third desired fuel rail pressure) between time $t_3$ and time $t_4$, and does not need to be varied to achieve the desired fuel rail pressure, both the pressure up and the pressure down valve remain closed from time $t_3$ to time $t_4$. At time $t_4$, however, the desired fuel rail pressure increases from the third desired fuel rail pressure to a fourth desired fuel rail pressure. As shown, in this example, the fourth desired fuel rail pressure is greater than the third desired fuel rail pressure.

In this example, the need for transitioning the current fuel rail pressure from the third fuel rail pressure to the fourth fuel rail pressure is urgent (e.g., due to rapid acceleration to peak torque output conditions). To quickly increase the current fuel rail pressure to the fourth desired fuel rail pressure, the pressure up valve is fully opened from time $t_4$ to time $t_5$, as shown in diagram 430. Because the opening amount of the pressure up valve here is larger relative to the opening amounts of the pressure down and pressure up valves during time intervals $t_0$ to $t_1$ and $t_2$ to $t_3$, respectively, the opening duration to achieve the desired increase in fuel rail pressure is shorter relative to the opening durations of the pressure down and pressure up valves during time intervals $t_0$ to $t_1$ and $t_2$ to $t_3$, respectively. Accordingly, by fully opening the pressure up valve, a desired fuel rail pressure increase may be achieved quickly when needed to meet engine fuel pressure demands. Meanwhile, the pressure down valve remains fully closed from time $t_4$ to time $t_5$.

At time $t_5$, the current fuel rail pressure achieves the fourth desired fuel rail pressure, and the pressure up valve is closed. Because the current fuel rail pressure is equal to the desired fuel rail pressure (i.e., the fourth desired fuel rail pressure) between time $t_5$ and time $t_6$, and does not need to be varied to achieve the desired fuel rail pressure, both the pressure up and the pressure down valve remain closed from time $t_5$ to time $t_6$. At time $t_6$, however, the desired fuel rail pressure decreases from the fourth desired fuel rail pressure to a fifth desired fuel rail pressure. As shown, the fifth desired fuel rail pressure is equal to the third desired fuel rail pressure. However, in this example, the need for transitioning the current fuel rail pressure from the fourth fuel rail pressure to the fifth fuel rail pressure is less urgent relative to the transition from the third fuel rail pressure to the fourth fuel rail pressure described above. Accordingly, although the change in fuel rail pressure needed at time $t_6$ is of the same magnitude as the change in fuel rail pressure needed at time $t_4$, the valve opening amount and duration are different between the two intervals. Specifically, the pressure down valve opening amount is smaller here relative to the pressure up valve opening amount at time $t_3$, and the pressure down valve opening duration is greater here relative to the pressure up valve opening duration (time $t_4$ to time $t_5$).

At time $t_7$, the current fuel rail pressure achieves the fifth desired fuel rail pressure, and the pressure down valve is closed (while the pressure up valve remains closed). It will be appreciated that after time $t_7$, the desired fuel rail pressure may change one or more additional times, and the pressure up and down valves may be controlled so as to achieve each new desired fuel rail pressure throughout operation of the engine and pressure regulation system.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for regulating gaseous fuel pressure in an engine, comprising:
    increasing a regulating pressure in a low pressure chamber of a pressure regulator by opening a first valve arranged in a conduit coupling the low pressure chamber with a reference chamber of the pressure regulator and flowing fuel from the low pressure chamber to the reference chamber while closing a second valve arranged in a conduit coupling the reference chamber with an engine intake manifold, and then closing the first valve after a first duration such that both the first and second valves are closed and the reference chamber is sealed;
    decreasing the regulating pressure by closing the first valve while opening the second valve, and then closing the second valve after a second duration such that both the first and second valves are closed and the reference chamber is sealed.

2. The method of claim 1, wherein opening the first valve communicates the low pressure chamber of the pressure regulator with the reference chamber regardless of whether the low pressure chamber is in fluid communication with a high pressure chamber of the pressure regulator, and wherein opening the second valve communicates the reference chamber with the engine intake manifold.

3. The method of claim 2, further comprising flowing gaseous fuel at the regulating pressure from the low pressure chamber to a fuel rail of the engine.

4. The method of claim 3, further comprising delivering gaseous fuel from a high pressure fuel tank to the high pressure chamber of the pressure regulator, the high pressure chamber fluidly communicating with the low pressure chamber via an aperture when a pressure in the reference chamber exceeds a threshold.

5. A system for a gaseous-fueled engine, comprising:
    a gaseous fuel tank;
    a pressure regulator comprising a high pressure chamber coupled with the tank, a low pressure chamber coupled with an engine fuel rail, and a reference chamber;
    a first valve controlling fuel flow from the low pressure chamber to the reference chamber, the first valve arranged in a conduit which fluidly couples the low pressure chamber with the reference chamber when the first valve is open, regardless of whether the low pressure chamber is in fluid communication with the high pressure chamber; and
    a second valve controlling fuel flow from the reference chamber to the engine, wherein control of the valves is based on engine fuel pressure.

6. The system of claim 5, wherein fuel exhausted from the reference chamber to the engine via the second valve is combusted by the engine.

7. The system of claim 6, wherein control of the valves is further based on electronic pressure feedback.

8. The system of claim 7, wherein the electronic pressure feedback comprises feedback from a fuel rail pressure sensor.

9. The system of claim 8, wherein the valves are controlled responsive to a desired fuel rail pressure.

10. The system of claim 9, wherein the fuel is compressed natural gas (CNG).

11. The system of claim 5, further comprising a third valve arranged within the pressure regulator and a diaphragm arranged within the pressure regulator, wherein a position of the third valve depends on a pressure in the reference chamber, a pressure in the low pressure chamber, and a spring force provided by a spring arranged in the reference chamber, the spring coupled with a bottom of the pressure regulator on one end thereof and with a bottom of the diaphragm on another end thereof.

12. A method for regulating engine gaseous fuel injection pressure, comprising:
    responsive to a demand for higher fuel pressure, opening a first valve in a conduit coupling a reference chamber of a pressure regulator with a low pressure chamber of the regulator for a first duration to flow gaseous fuel to the reference chamber from the low pressure chamber, closing a second valve arranged in a conduit coupling the reference chamber to the engine, and then closing the first valve after the first duration has elapsed such that both the first and second valves are closed and the reference chamber is sealed; and
    responsive to a demand for lower fuel pressure, closing the first valve, opening the second valve for a second duration to exhaust gaseous fuel from the reference chamber to the engine, and then closing the second valve after the second duration has elapsed such that both the first and second valves are closed and the reference chamber is sealed.

13. The method of claim 12, wherein opening the first and second valves varies a pressure of a fuel rail of the engine by varying a regulating pressure in the low pressure chamber, the fuel rail fluidly communicating with the low pressure chamber.

14. The method of claim 13 further comprising, throughout engine operation, varying the fuel rail pressure responsive to varying fuel pressure demands.

15. The method of claim 14, further comprising regulating a pressure of gaseous fuel from a high pressure fuel tank to the regulating pressure via the regulator, the tank fluidly communicating with a high pressure chamber of the regulator.

16. The method of claim 15, further comprising controlling fuel flow from the tank to the high pressure chamber of the regulator via a third valve, and controlling fuel flow from the low pressure chamber of the regulator to the fuel rail via a fourth valve.

17. The method of claim 12, wherein when the second valve is opened responsive to the demand for lower fuel pressure, an opening amount of the second valve and the second duration are based on a current fuel rail pressure and a desired fuel rail pressure, and wherein when the first valve is opened responsive to the demand for higher fuel rail pressure, an opening amount of the first valve and the first duration are based on the current fuel rail pressure and the desired fuel rail pressure.

18. The method of claim 12, wherein the low pressure chamber fluidly communicates with the reference chamber when the first valve is open, regardless of whether the low pressure chamber is in fluid communication with the high pressure chamber.

* * * * *